United States Patent [19]
Ostrowski

[11] 4,156,567
[45] May 29, 1979

[54] RANGING AND LENS FOCUSING MODULE FOR FOLDABLE CAMERAS
[75] Inventor: John C. Ostrowski, Maynard, Mass.
[73] Assignee: Polaroid Corporation, Cambridge, Mass.
[21] Appl. No.: 888,944
[22] Filed: Mar. 22, 1978
[51] Int. Cl.² .................. G03B 17/02; G03B 7/08
[52] U.S. Cl. ................................. 354/288; 354/195
[58] Field of Search ............... 354/25, 60 R, 195, 288
[56] References Cited
U.S. PATENT DOCUMENTS
4,020,496  4/1977  Peterson et al. ............... 354/25

Primary Examiner—Russell E. Adams
Attorney, Agent, or Firm—David R. Thornton

[57] ABSTRACT

An automatic range finding and lens focusing module particularly adapted for attachment to the top edge of a pivotal shutter housing of a foldable camera. The module incorporates a complete assembly of accoustical, electronic, mechanical and electro-mechanical components necessary for system operation, such components being supported by a pair of parallel plates adapted for direct attachment to a shutter assembly modified only to provide mounting lugs and a coupling of a module output gear to a rotatable lens mount. The connection facilitates calibration of the module components with lens focusing movement.

8 Claims, 10 Drawing Figures

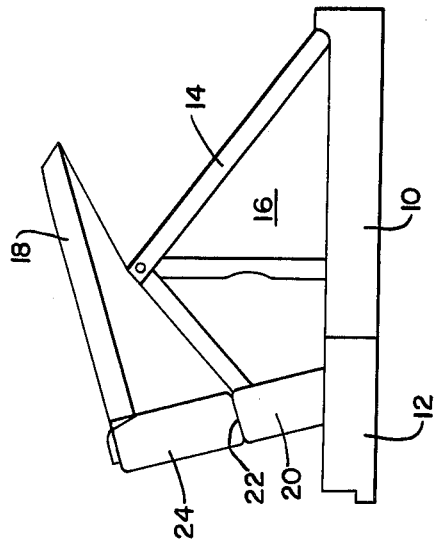
FIG. 1.
FIG. 2.
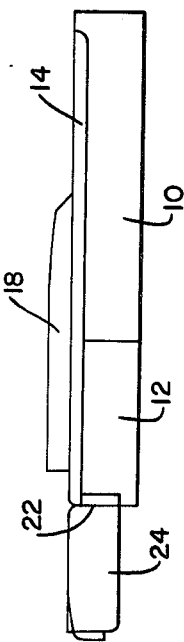
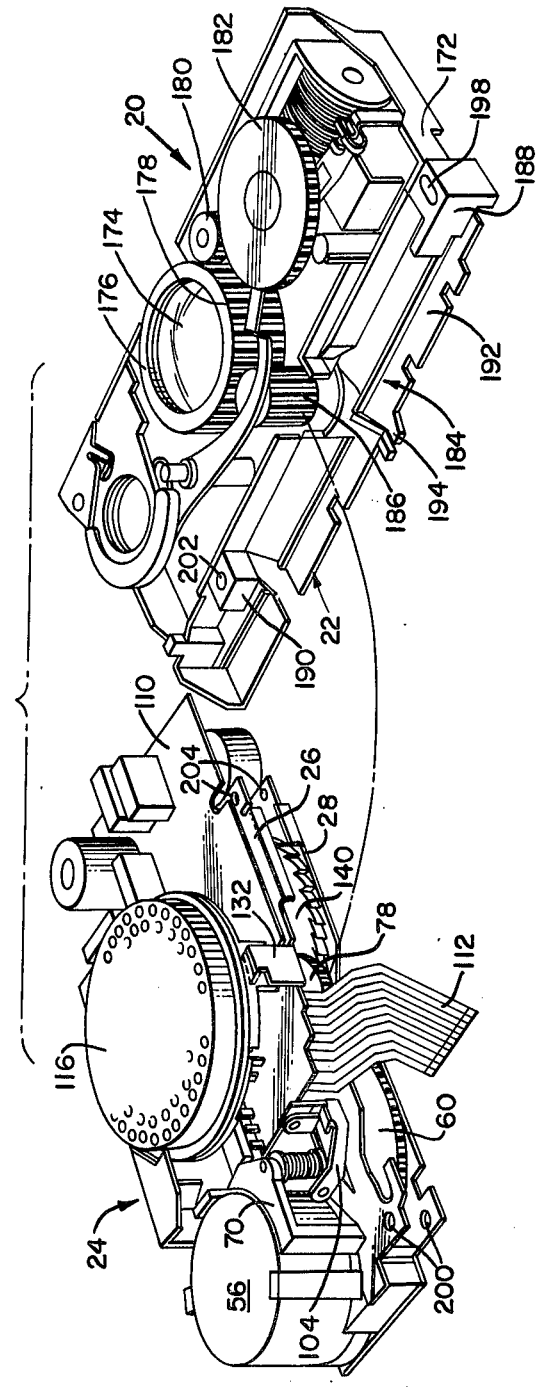
FIG. 3.

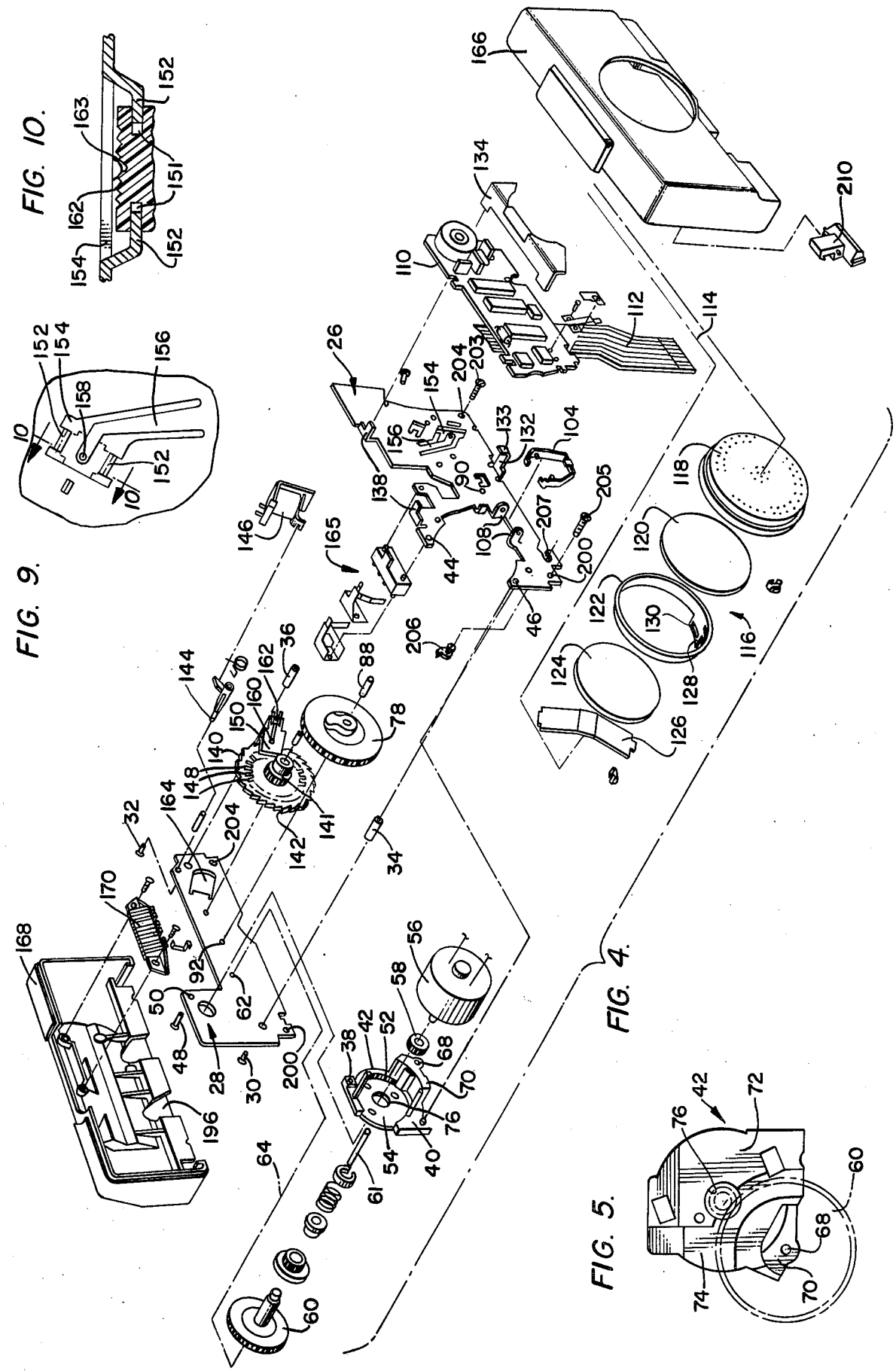

RANGING AND LENS FOCUSING MODULE FOR FOLDABLE CAMERAS

BACKGROUND OF THE INVENTION

This invention relates to accoustic ranging systems for cameras and more particularly, it concerns a ranging system module adapted for attachment as a unit to an existing camera with minimal modification to camera construction.

In a commonly assigned co-pending application Ser. No. 729,289, filed Oct. 4, 1976, in the name of Edwin K. Shenk, there is disclosed a camera lens focusing mechanism in which a sonic pulse generated by a camera mounted transducer is reflected from a subject to be photographed and received by the transducer to provide a range signal related to camera-subject distance. An electronic logic circuit responds to the range signal to produce a train of pulses, the number of which is representative of the lens mount axial position at which the subject will be in focus. Such pulses are gated into a counter and used for operating a drive motor coupled mechanically to the lens mount. An encoder wheel coupled rotatably with the lens mount operates as a component of an auxiliary pulse generator in a feedback system so that rotation of the drive motor under the control of the counter causes the auxiliary pulse generator to produce a predetermined number of pulses for each axial unit displacement of the lens mount. The logic circuit further responds to the output of the auxiliary pulse generator to determine when the lens mount has been moved to the position determined by the pulse train counter to be proper for focusing the subject to be photographed. Such further logic circuitry response results in a pawl engaging a lens mount coupled rack to stop movement of the lens mount at the proper focusing position even though the drive motor may continue to rotate. A slip clutch in the drive train between the motor and the lens mount facilitates this latter operating characteristic.

Such ranging systems involve as assembly of electronic, electrical and mechanical components which must be capable of smooth, precise operation in the assembly as well as accurate calibration with the lens focusing components of the camera with which the system is used.

These requirements coupled with the desirable attainment of low cost manufacture necessitate a ranging system or module capable of being pre-tested prior to assembly of the ranging system module with a camera. In addition, the physical interconnection of the ranging module with the camera must accomodate the basic camera design. In this latter respect, particular difficulty is encountered where the camera is foldable in a manner such that the lens and lens housing is adjustable between a collapsed storage condition and an erect operative condition.

SUMMARY OF THE PRESENT INVENTION

In accordance with the present invention, a unique ranging system module is provided for incorporation directly into a foldable camera body with minimal modification of camera structure. Structural support for all components of the module is provided by spaced front and back metal mounting plates apertured to provide fore and aft journal openings for rotatable components and otherwise formed to receive all physical parts of of a complete accoustical ranging and lens focusing system. Such physical parts include an electronic circuit board, an accoustic transducer, an electric drive motor, a lens focus position detector and a clutched drive train from the motor to a module output gear capable of being latched against rotation in a position corresponding to proper lens focus in response to system conditions. The mounting plates further provide a facility for direct attachment of the module to the upper edge of the shutter assembly of an existing camera construction modified only to include an additional lens mount driving pinion in a position to mesh with the output drive gear of the module and to provide mounting lugs to which the support plates of the module may be fixed.

Among the objects of the present invention are, therefore: the provision of a self-contained ranging and lens focusing module capable of direct attachment to the shutter assembly of an existing camera; the provision of such a module which may be mounted to an existing foldable shutter assembly in a manner presenting no obstruction to existing camera operation including adjustment between collapsed and erect conditions; the provision of such a ranging and lens focusing module in which components are interconnected with clockwork precision; the provision of such a module which is easily assembled and mounted to a camera shutter assembly; and the provision of such a module which prior to mounting on the camera constitutes an operative unit capable of pre-testing and which may be accurately calibrated with a focusing lens mount carried by the shutter assembly to which the module is mounted.

Other objects and further scope of applicability of the present invention will become apparent from the detailed description to follow taken in conjunction with the accompanying drawings in which like parts are designated by like reference numberals.

BRIEF DESCRIPTION OF THE DRAWINGS

FIG. 1 is a side elevation depicting the exterior configuration of a foldable camera to which the module of the present invention has been attached;

FIG. 2 is a similar view but with the camera in an erect condition;

FIG. 3 is an exploded perspective view depicting the attachment of the module and camera shutter assembly;

FIG. 4 is an exploded perspective view illustrating the components of the module of the present invention;

FIG. 5 is a rear elevation of a motor mount used in the module;

FIG. 9 is an enlarged fragmentary elevation of the front plate of the module; and FIG. 10 is an enlarged fragmentary cross-section on line 10—10 of FIG. 9.

DETAILED DESCRIPTION OF THE PREFERRED EMBODIMENT

Figure 6:
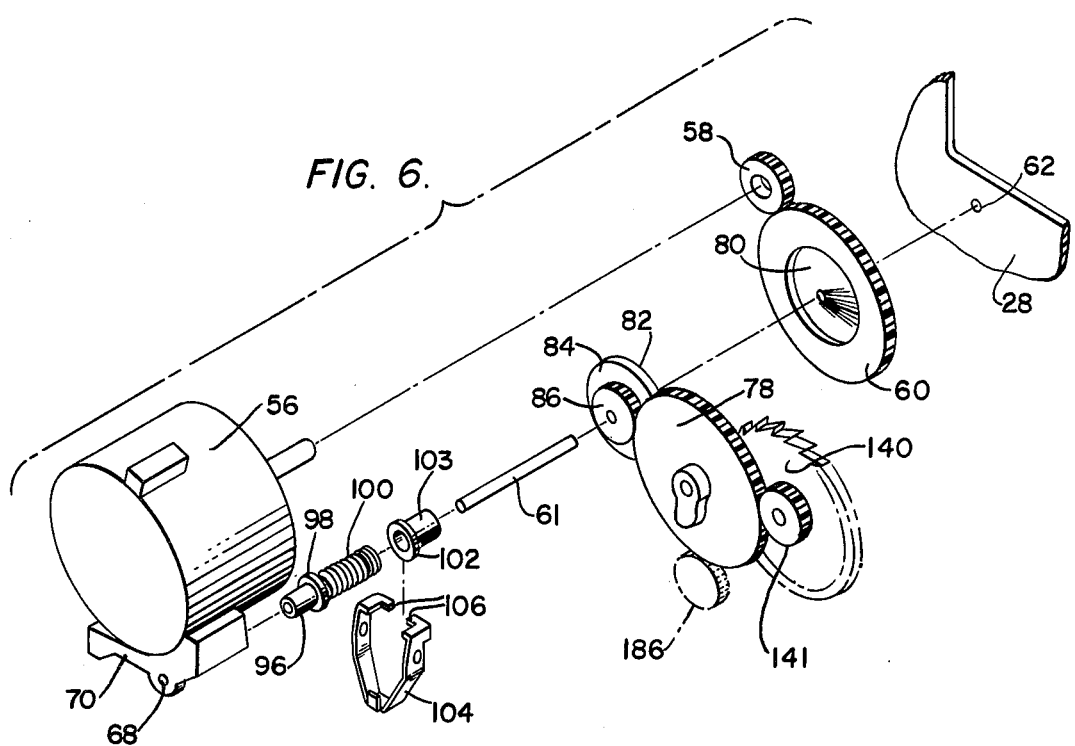
FIG. 6 is an exploded perspective view of a gear train used in the module.

In FIGS. 1 and 2 of the drawings, a foldable, single lens reflex, instant camera of the type available commercially under the tradename "Polaroid SX-70 Land Camera" is shown in its folded and erect conditions, respectively. Although the illustrations in FIGS. 1 and 2 are largely schematic, the basic components of the camera will be recognized as including a base 10, a processor and lens cover module 12, a hinged cover 14 connected by the base 10, a viewfinder 18 and a shutter assembly 20. As is well known, the camera is used in the erect condition illustrated in FIG. 2 and is foldable to the position of FIG. 1 for carrying and storage. Also it will be seen from these figures that the shutter assembly 20, which is pivoted at its lower end, moves from the position shown in FIG. 2, in which the camera lens to be described is presented from the front of the shutter, to a position within the module 12 where the lens is covered by the floor of the module 12. It will be noted, moreover, that the top edge 22 of the shutter assembly 20 in the presently available camera is presented to an unobstructed space both in the erect condition of FIG. 2 and in the folded or collapsed condition depicted by FIG. 1. This characteristic is employed in existing cameras to accomodate a mount by which a flash lamp may be synchronized with components within the shutter assembly 20. In accordance with the present invention, this exposed characteristic of the top edge surface 22 of the existing camera shutter assembly is utilized to mount a ranging and lens focusing module to which the present invention relates and which is designated generally in the drawings by the reference numeral 24.

Although the manner in which the module 24 is mounted to and operably associated with the shutter assembly 20 will be described in more detail below, reference is first made to FIG. 4 of the drawings in which the individual components of the module are illustrated in exploded perspective. Primary structural support for all the components illustrated in FIG. 4 is provided by front and back metal plates 26 and 28 adapted to be secured together in parallel spaced relationship by screws 30 and 32 or other equivalent fastening means such as rivets or the like extending through or into spacing sleeves 34 and 36, respectively. The spaced interconnection of the front and rear plates 26 and 28 is further strengthened by flange-like spacer block portions 38 and 40 on a motor and drive train mount 42. Specifically, the mount 42 is formed with projections adapted to extend through apertures 44 and 46 in the front plate 26 and be fused over for a secure connection of the mount to the front plate. Securement of the mount 42 to the back plate is effected by a screw 48 or its equivalent through an aperture 50.

The mount 42 is adapted to be integrally formed of a suitable synthetic resinous material and defines a forwardly facing fragmentary cylindrical socket 52 having an end face 54 and adapted to receive a lens focusing drive motor 56 by snap fit interconnection of the motor in the socket. When so mounted, a drive pinion gear 58 keyed with the motor drive shaft is positioned rearwardly of the base 54 and in mesh with a relatively large gear 60 journalled on a shaft 61 from the rear plate by a bearing aperture 62 (note the broken line projection axis 64). The forwardly projecting end of the shaft 61 supporting the gear 60 is received in a bearing aperture 68 in the mount 42. In FIG. 4 and also in FIG. 5 where the back of the mount 42 is shown, it will be noted that the aperture 68 is in a forwardly disposed arcuate bracket portion 70 spaced from the back plate 28 against which a rear surface 72 on the mount 42 abuts. A portion of the mount back is a recess to establish a surface 74 to be spaced from the back plate 28 by a distance to accomodate the thickness of the gear 60. Thus, it will be seen that the pinion gear 58 can extend through a central aperture 76 of the mount 44 and be in meshing engagement with the pinion gear 60.

The drive train from the motor 56 to an output gear 78 of the module 24 is illustrated most clearly in FIG. 6 of the drawings as viewed from the motor toward the plate 28. Reference is also made to FIG. 4 for journal shaft aperture location in the respective front and back plates 26 and 28. It will be noted that the relatively large gear 60 in mesh with the motor keyed pinion gear 58 is formed with a conical clutch surface 80 cooperable with a complementary face 82 on a disc 84 having a forwardly mounted gear 86. The gear 86 is in meshing engagement with the periphery of the output gear 78 rotatably supported between the plates 26 and 28 by a pin axle 88 engagable in apertures 90 and 92 in the front and back plates, respectively. The gear 60 and disc 84 are rotatably supported on the pin shaft or axle 61 in axial alignment with a sleeve 96 having an abuttment collar 98. A compression spring 100 is provided on the rear end of the sleeve to engage at one end the collar 98 and at its opposite end a flange or collar 102 on a further sleeve 103. The rear end of the sleeve 103 engages the face of the small gear 86 and thus, urges the conical clutch base 82 on the disc 84 into frictional engagement with the clutch face 80 on the gear 60. In this way, the torque transmitted by the motor to the output gear 78 will be limited by the torque transmitted through the friction clutch faces 80 and 82. A U-shaped lever 104 having inwardly directed lifting tangs 106 is adapted to be pivoted from tabs 108 (FIG. 4) projecting forwardly of the front mounting plate 26. The inwardly directed tabs on the member 104 engage the rear of the collar 102 in a manner such that the loading of the clutch faces 80 and 82 by the spring 100 may be relieved to disengage the motor 56 from the output gear 78.

In accordance with the automatic ranging and lens focusing system disclosed in the above-mentioned copending application Ser. No. 729,289, a range signal related to camera-subject distance is developed by measuring the time interval between transmission and reception of a sonic pulse. A train of pulses produced by an electronic logic circuit in response to the range signal are gated into a counter for operating a lens coupled drive motor under the control of a feedback system resulting in stoppage of lens mount movement when it is positioned for accurate focusing of the subject to be photographed on the camera film plane. Components required for the achievement of this operation are therefore incorporated in the module 24. The electronics logic circuitry of the system is incorporated in a circuit board 110 having a printed circuit strip 112 for electrical connection of electronic components in accordance with the disclosure of the aforementioned patent application. The board 110 is secured by tabs struck forwardly from the front face of the plate 26. Assembled over the circuit board 110 as depicted by the projection line 114 in FIG. 4 is a transducer 116.

The transducer 116 is a capacitance-type electroacoustical transducer of a construction described fully in another commonly assigned copending application Ser. No. 806,056, filed June 13, 1977 by R. Paglia. Such transducers, as illustrated in FIG. 4, include a circular apertured cover 118, a diaphragm 120 having a conductive front face, an inner support ring 122, a back plate 124 and a leaf spring 126 by which the assembly is both retained as a unit and also by which the back plate 24 is biased against the diaphragm 120 with the appropriate force. The ring 122, which is of dialectric or synthetic resinous material, is provided with at least one rearwardly extending cylindrical tab 128 having a slot 130 formed therein. To mount the pre-assembled transducer 116 on the front plate 26 over the circuit board 110, a forwardly extending tab 132 is provided at the lower edge of the plate 26 and provided with an up struck tang 133 to engage in the slot 130 of the ring 122. The upper portion of the assembled transducer is received in a plastic shroud bracket 134 formed to be securely mounted on forwardly struck tabs 138 at the top edge of the plate 26.

As a further incident to the ranging and lens focusing system embodied in the structural module 24, an encoder wheel 140 is journalled between the front and back plates and provided with a pinion gear 141 on its front surface adapted to be in meshing engagement with the output gear 78. The periphery of the encoder wheel 140 is provided with ratchet teeth 142 adapted to be engaged by a pawl 144 pivoted between the plates 26 and 28 and actuated by a solenoid 146. It will be appreciated, therefore, that in light of the friction drive between the motor 56 and the output gear 78, operation of the motor will drive the gear 78 and also the encoder wheel 140 for so long as the pawl member is out of engagement with the ratchet teeth 142. Upon actuation of the solenoid 146 to move the pawl 144 into engagement with the ratchet teeth 142, further rotation of the encoder wheel 40 as well as the output gear 78 will cease.

As part of the feedback control of the ranging and lens focusing system disclosed in the afore-mentioned co-pending application Ser. No. 729,289, the encoder wheel 140 is provided with a series of angularly spaced openings 148 which pass between light source and light sensitive elements (not shown) supported within a U-shaped detector unit 150. Thus, a pulse is generated by the detector unit each time one of the openings 148 in the encoder wheel passes through unit 150.

In the disclosed embodiment, the detector unit 150 is supported, as shown in FIGS. 4, 9 and 10, by the front plate 26 in a manner permitting calibrating adjustment of the unit with respect to the encoder wheel. The unit 150 is provided with inwardly extending slots 151 (see FIG. 10) lying essentially in the plane of the encoder wheel 140 to receive edge portions 152 of an aperture 154 in the plate 26. A spring tab 156 having a pivot fulcrum 158 at its end will engage in a recess 160 in the detector unit. Radiating serrations 162 on the detector unit are engaged by a tang 163 struck from the rear face of the plate 26. The detector unit is accomodated by an opening 164 in the back plate 28.

The plates 26 and 28 additionally support electrical switching components as needed for operation of the logic circuitry in accordance with the operation described in co-pending application Ser. No. 729,289. For example, a switch block assembly 165 is secured between the plates by attachment at the upper left-hand portion of the front plate 26 as may be seen in FIG. 4 of the drawings. The assembled module is enclosed by front and back casing halves 166 and 168 also shown in FIG. 4. A flash unit receptacle 170 is supported by the rear casing half 168 and operates in the manner of the conventional flash socket previously mounted on the top surface 22 of the shutter housing 20.

Figure 7:
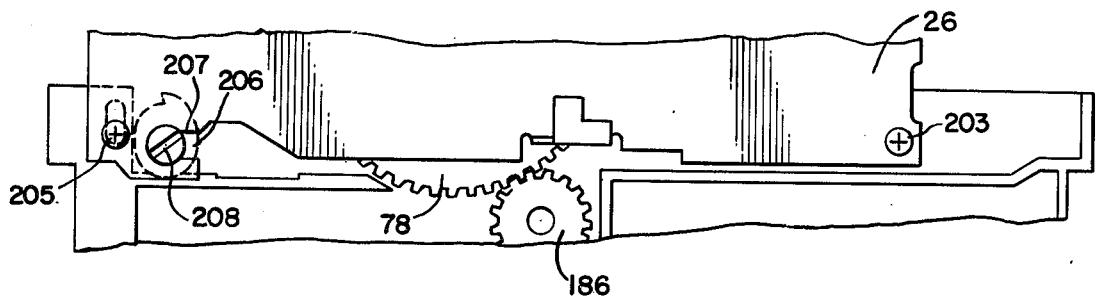
FIG. 7 is a fragmentary front elevation of the module mounting components.
Figure 8:
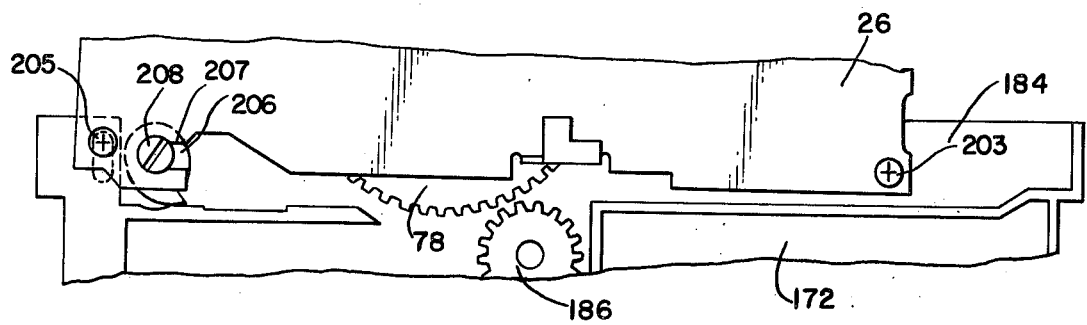
FIG. 8 is a fragmentary front elevation of the components shown in FIG. 7 but in a different position.

The manner in which the module 24 is assembled with the shutter assembly 20 of the camera depicted in FIGS. 1 and 2 may be understood by reference to FIGS. 3, 7 and 8 of the drawings. In FIG. 3, the shutter assembly 20 is shown with the front protective cover thereof removed. As in the past, primary structural support for components within the shutter housing are provided by a shaped or molded shutter block or lens board 172 from which a movable lens element 174 is supported by a cylindrical mount 176 having gear teeth 178 extending axially about the periphery thereof. As in existing cameras of which the shutter housing 20 is a part, the teeth 178 on the lens mount 176 engage with a pinion gear 180 meshing with teeth on a manual focusing wheel 182. With the exception of an upper edge portion or formation 184 to be described and an additional pinion gear 186 in mesh with the gear teeth 178 on the lens mount 176, the shutter housing illustrated in FIG. 3 is identical to prior constructions.

The upper edge formation 184 is modified in accordance with the present invention to define a pair of mounting blocks or lugs 188 and 190 spaced forwardly of a vertical flange 192. Projecting from the flange 192 is a bifurcated formation 194 adapted to be positioned in a recess 196 in the rear cover member 168 (FIG. 4) and to encompass the portion of the output gear axle 88 which extends through the aperture 92 in the back plate 28. In this way, lateral alignment of the module 24 with the shutter assembly may be facilitated during assembly.

The mounting lug 188 is provided with a vertically oriented slot opening 198 adapted to be aligned with a pair of apertures 200 at the lower left-hand corner of the front and back plates 26 and 28 while the mounting lug 190 is provided with a circular aperture 202 adapted to be aligned with a pair of apertures 204 in the front and back plates 26 and 28 at the lower right-hand corners thereof.

Assembly of the module 24 to the shutter assembly 20 is effected by first sliding the assembled module downwardly against the upper edge formation 184 of the lens board 172 until a bolt 203 (FIG. 4) or other suitable similar fastener may be inserted through the apertures 204 in the front and back plates and the aperture 202 in the mounting lug 190. A similar bolt 205 will then be passed through the apertures 200 and the slot aperture in the lug 188.

A manually actuated cam 206 is mounted in a slot-like formation 207 at the lower left-hand side of the front plate 26 and is equipped with a screw driver slot 208 by which the cam may be moved between the respective positions shown in FIGS. 7 and 8 of the drawings. Thus after the module 24 is preliminarily assembled with the shutter assembly 20, the cam 206 is moved to the position shown in FIG. 8 in which the module output gear 78 is out of mesh with the pinion gear 186 in the shutter assembly 20. In this condition, the gear train from the motor 56 to the output gear 78 can be rotated for calibration of the encoder wheel 140 with the focusing positions of the lens mount 176. Once such calibration has been completed, the cam 206 is rotated to the position shown in FIG. 7 and the assembly is secured by bolts 203 and 205 with the output gear 78 of the module in meshing engagement with the pinion gear 186.

In the operation of the camera with the module attached, the accoustical ranging system will operate to transmit a pulse from the transducer 116 toward the subject to be photographed to develop a control signal corresponding to the distance between the camera and the subject. The motor 56 is actuated to drive the gear 78 and thus rotate the lens mount 174 for focusing adjustment thereof. When the lens has been focused to a position corresponding to the camera/subject distance, the solenoid 146 is actuated to arrest movement of the encoder wheel 140 and thus of the gear 78. Any further rotation of the gear 60 by the motor 56 will be accomodated by slippage between the conical clutch faces 80 and 82.

In the event it is desired to focus the lens manually, a pivotal tab 210 (FIG. 4) supported by the module front casing 166 in a position to overlie both the manual lens focusing wheel 182 and the U-shaped clutch bias lever 104. Depression of the pivotal tab 210 will release the motor drive to the gear 78 so that the gear 78 and the encoder wheel 140 will rotate upon manual focusing rotation of the lens mount 176. In this way, the calibration of the encoder wheel 140 with lens focusing movement will be retained for subsequent automatic operation.

With reference again to FIGS. 1 and 2 of the drawings, it will be seen that the module 24, when attached to the top edge 22 of the shutter assembly, defines an exterior configuration in which front, rear and end surfaces of the module are co-extensive with corresponding surfaces on the shutter assembly 20. In the collapsed condition shown in FIG. 1, the module 24 is merely a forward extension of the edge of the camera previously established by the top edge 22 of the shutter assembly. In the erect condition depicted in FIG. 2, the module 24 is an upward extension of the rectangular parallelepiped defined by the assembly 20. As such, the functional components of the module 24, particularly the transducer 116, is positioned in the same reference plane with the front face of the shutter housing from which camera-subject distances are advantageously determined. Still, the module presents no obstruction to movement of camera components between folded and erect conditions nor does it detract, in any critical way, from the intended storage or operative utility of these respective camera conditions.

Thus, it will be seen that as a result of the present invention an extremely effective ranging and lens focusing module is provided, which is particularly suitable for foldable cameras of the type mentioned and by which the afore-mentioned objectives are completely fulfilled. It will be apparent to those skilled in the art from the preceding description that modifications therein may be made without departing from the inventive concepts manifested by the disclosure. Accordingly, it is expressly intended that the foregoing description is illustrative of a preferred embodiment only, not limiting, and that the true spirit and scope of the present invention be determined by reference to the appended claims.

What is claimed is:

1. In a foldable camera having a shutter assembly of generally rectangular parallelepiped configuration to provide a front face from which a rotatable focusing lens mount is presented, the shutter assembly being pivoted for movement between an erect position in which the lens mount is presented from the front of the camera and a collapsible position in which the top edge of the shutter assembly is presented as an edge of the collapsed camera, a ranging and lens focusing module comprising:

front and rear generally planar structural plates coupled together in substantially parallel spaced apart relationship;

a sonic transducer assembly mounted on the outside face of said front plate to face forwardly thereof;

a gear train mounted from the inside face of at least one of said plates and sandwiched between said plates and including an output gear having peripheral teeth portions presented from the bottom of said module and angular positions corresponding to angular positions of the lens mount in which subjects to be photographed are in focus;

an encoder wheel rotatably supported between said plates and having a gear drive operably connected with said gear train for synchronized rotation with said output gear;

a detector unit mounted between said plates in operable relationship with said encoder wheel;

an electric motor mounted from at least one of said plates and having an output shaft coupled to said gear train;

a generally planar electronic component board mounted on one major surface of one of said plates;

an external protective casing having an opening and enclosing at least the front, rear and top portions of the assembly comprising the aforementioned module components with said sonic transducer assembly being operably aligned with said opening; and means for connecting said module to the top of the shutter assembly with its said output gear operably coupled to the lens mount, said module being structured so that the front, rear and exterior surfaces of its said protective casing substantially constitute coplanar extensions of the corresponding surfaces of the shutter assembly, said electronics board being energizable to activate said transducer and utilize said transducer to ascertain the range of a subject to be photographed, to energize and control the operation of said motor, said encoder wheel and said detector to effect the rotation of said output gear and thus the camera's lens mount, into an angular position as a function of the subject range ascertained by said module.

2. The apparatus recited in claim 1 wherein said connecting means comprises an upper edge extension of a lens board in the shutter assembly, said extension providing mounting lugs to extend between said structural plates.

3. The apparatus recited in claim 2 wherein said connecting means comprises a pinion gear journalled on said lens board and in meshing engagement with the lens mount, said pinion gear being in mesh with said output gear when said module is mounted on the shutter assembly.

4. The apparatus recited in claim 1 wherein said external casing is defined by coupled front and rear casing halves.

5. The apparatus recited in claim 1 including a motor support mount comprising a generally cylindrical motor receptacle terminating rearwardly in a centrally apertured end face and projecting forwardly from a flanged portion having front and rear faces in abutting engagement respectively with said front and rear plates.

6. The apparatus recited in claim 5 wherein said gear train includes a pinion gear mounted on said motor output shaft and a clutch gear assembly, and said rear face of said flanged portion is recessed to define a surface portion spaced from and parallel to said rear plate and means for mounting said clutch gear assembly between said recessed surface portion and said rear plate in mesh with said motor shaft pinion gear.

7. The apparatus recited in claim 6 wherein said clutch gear assembly includes a forwardly oriented friction face and an axle pin for supporting said clutch gear assembly, said motor mount having a bracket portion for supporting the front end of said pin and said rear plate having an aperture for supporting the rear end of said pin.

8. The apparatus recited in claim 1 including means for supporting said detector unit adjustably from said front plate, said detector supporting means comprising an aperture in said front plate having rearwardly depressed side edges to engage said detector unit slidably for movement in a plane parallel to said front plate, a leaf spring portion of said front plate projecting into said aperture and having a rearwardly directed pivot fulcrum at its end to engage a pivot recess in said detector unit.

* * * * *